United States Patent [19]
Palachek et al.

[11] 3,813,186
[45] May 28, 1974

[54] ROTOR BLADE SHEAR REINFORCEMENT

[75] Inventors: Charles V. Palachek, Smithfield; William K. Underhill, Jr., Bedford, both of Tex.

[73] Assignee: Textron Incorporated, Providence, R.I.

[22] Filed: Oct. 10, 1972

[21] Appl. No.: 295,887

[52] U.S. Cl................ 416/226, 416/144, 416/233
[51] Int. Cl.... B64c 27/46, B64c 27/00, B64c 11/24
[58] Field of Search ............ 416/226, 229, 233, 144

[56] References Cited
UNITED STATES PATENTS

| | | | |
|---|---|---|---|
| 2,574,651 | 11/1951 | Meyers | 416/226 |
| 3,002,567 | 11/1961 | Stulen et al. | 416/226 |
| 3,155,166 | 11/1964 | Stulen et al. | 416/226 |
| 3,566,493 | 3/1971 | Poucher et al. | 416/233 |

Primary Examiner—Carlton B. Croyle
Assistant Examiner—Louis T. Casaregola
Attorney, Agent, or Firm—Richards, Harris & Medlock

[57] ABSTRACT

Stiffness and shear resistance necessary for a helicopter rotor blade is provided by a first honeycomb cellular structure whose cells extend across the blade thickness and which structure spans at least that portion of the blade chord which includes the longitudinal boundary between a leading edge spar and a trailing edge skin section and a second honeycomb cellular structure joined to the trailing edge of the first structure of density less than the density of the first cellular structure. The front leading edge spar is joined to an upper trailing skin and a lower trailing skin which join at a trailing edge seam. The honeycomb sections are enclosed within the leading edge spar and a tapering chamber formed by the upper and lower skins.

10 Claims, 4 Drawing Figures

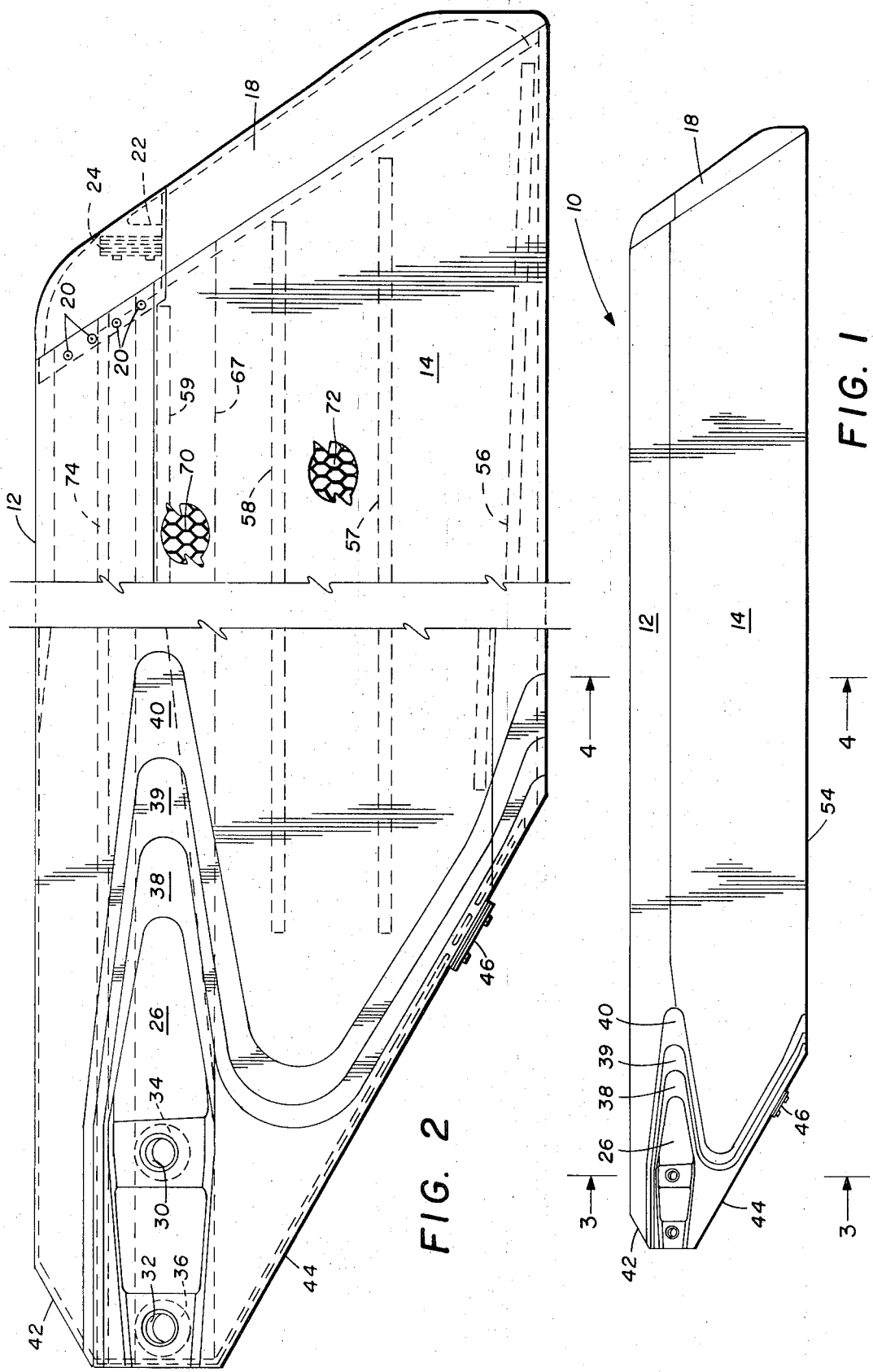

PATENTED MAY 28 1974

ROTOR BLADE SHEAR REINFORCEMENT

This invention relates to an airfoil and more particularly to an airfoil having a distributed shear resistant zone extending the length thereof.

Progress has been made in the reduction of a helicopter's power requirements with a view to enabling it to carry larger loads. It has been found that a large rotor enables the craft to make more efficient use of available power for vertical flight and hovering, at possibly some sacrifice of flight speed. The relationship between the size of a helicopter's rotor and the load it carries is called its "disc loading": it is the weight of the helicopter divided by the area of the "disc" swept out by the rotor. A helicopter with a very low disc loading, e.g., one to two pounds per square foot, could lift truly massive loads with a reasonable expenditure of power. To obtain reasonable disc loading levels, however, requires a blade design that enables the rotor to entrain large volumes of air without becoming too heavy for the aircraft and each rotor blade must have the required mechanical strength.

There is also considerable design activity to increase the forward flight speed of helicopters. When increasing the flight speed, the rotor blades must move substantially faster than at slower speeds of present day craft and the blade speed may approach the velocity of sound and possibly produce shock wave effects. These resulting shock waves sharply increase drag, reduce lift and cause severe mechanical stresses on the blades.

To meet the demands on the rotor blades for this new generation of high speed helicopters with greater lifting capability, many attempts have been made to provide a rotor blade with the necessary surface area and the required mechanical stress characteristics. Main rotor blades for helicopters have, heretofore, been made with a nose spar or leading edge spar constructed of a U-shaped channel of lightweight material but having high impact resistance. Stainless steel sheets in the form of a U-shaped channel provide a suitable material for the leading edge spar. The trailing edge of the nose spar has been supported by a rigid shear strip closure member to provide shear resistance. An upper and lower skin, suitably shaped to the appropriate airfoil design, is attached at the leading edge thereof to the trailing edge of the nose spar. The skin terminates in a sharp trailing edge seam. The interior of the skin covered portion of the blade is filled with a honeycomb pillar like cellular structure to impart the necessary stiffness thereto.

In accordance with the present invention, a rotor blade is provided wherein the shear strip member is eliminated. More particularly, a rotor blade includes a U-shaped leading edge spar opening toward the rear and coupled to lightweight upper and lower skins trailing the leading edge spar to a common trailing seam. A rigid high strength vertically oriented honeycomb cellular structure fills the leading edge spar and extends past the juncture between this spar and the trailing edge skins to a boundary somewhat aft of the trailing edge of the spar. A lightweight honeycomb cellular structure is adhesively secured at the boundary with the rigid high strength vertically oriented honeycomb structure to fill the void of the blade from the boundary to the trailing edge seam, the boundary with the high strength honeycomb structure providing a continuous zone of shear resistance spanning a substantial area in the region of the juncture between the spar and the lightweight skin.

In accordance with a more specific embodiment of the invention, a helicopter blade includes an outboard end and an inboard coupler with a leading edge spar between the end and coupler that has an upper rearward directed surface and a lower rearward directed surface. An upper skin and a lower skin between the outboard end and the inboard coupler are joined to the respective rearward directed surfaces of the leading edge spar to terminate at a trailing edge seam to form a tapering chamber. A first honeycomb cellular structure extends into the leading edge spar and into the tapering chamber between the upper and lower skins. A second honeycomb structure having a density less than the density of the first cellular structure is secured to the trailing edge of the first structure and fills the tapering chamber to the trailing edge seam.

A more complete understanding of the invention and its advantages will be apparent from the specification and claims and from the accompanying drawings illustrative of the invention.

Referring to the drawings:

FIG. 1 is a plan view of a rotor blade for coupling to the blade grip of the rotating mast;

FIG. 2 is an enlarged view of a helicopter blade partially cutaway illustrating construction details of a blade in accordance with the present invention;

Figure 3:
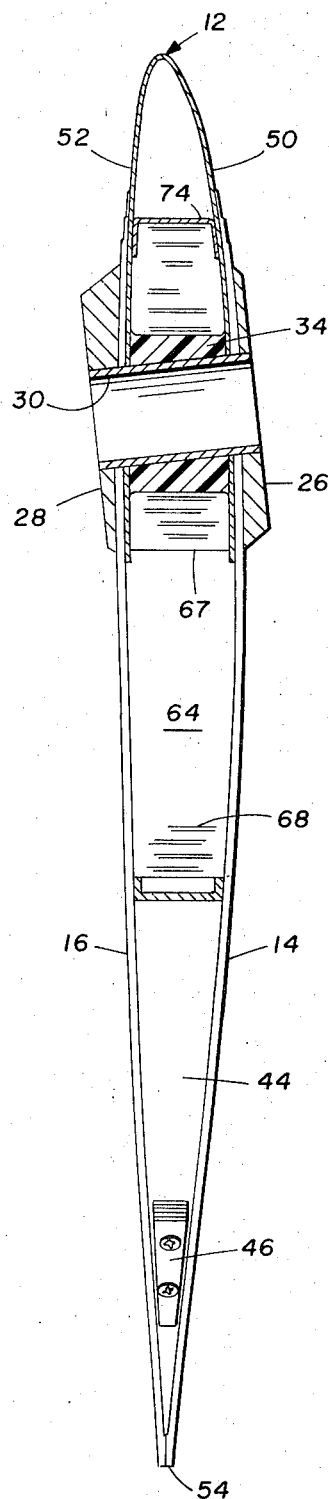
FIG. 3 is a section of a rotor blade taken along the line 3—3 of FIG. 1.

Referring to the FIGURES, there is shown a rotor blade 10 having a nose spar or leading edge spar 12 and upper and lower skin surfaces 14 and 16. An outboard end tip casting 18 is secured to the leading edge spar 12 and the skin sections 14 and 16. Typically, the leading edge spar 12 may be secured to the outboard end 18 by means of machine screws 20. As illustrated, the outboard end 18 is a hollow casting and includes a bracket 22 for carrying static span balance weights 24. The span balance weights 24 are in the form of thin shims and the number required is adjustable for individual rotor blade balancing.

At the inboard end of the rotor blade 10 there is an inboard coupler for attachment to the blade grip of a rotating mast in accordance with conventional helicopter design. The inboard coupler includes grip plates 26 and 28 positioned on the outside of the skin surfaces 14 and 16, respectively, and extending longitudinally along the blade. Extending through the grip plates 24 and 26 are bushings 30 and 32 for receiving fasteners to couple to the helicopter blade grip. Rigidity is imparted to the inboard coupler by means of a phenolic filler 34 and 36 for each of the bushings 30 and 32, respectively.

Extending along the longitudinal axis of the blade 10 from the grip plate 26 are doublers 38–40. These extend to the trailing edge seam formed at the termination of the upper and lower skin surfaces 14 and 16. A spar closure 42 is fastened in the inboard open end of the leading edge spar 12 and a root closure 44 is positioned between the upper and lower skin surfaces at the inboard end to enclose the tapering chamber formed by the skin surfaces. Attached to the root closure 44 are static chord balance weights 46 of a thin lamination material. The number of such weights required is adjustable for individual rotor blade balancing.

Figure 4:
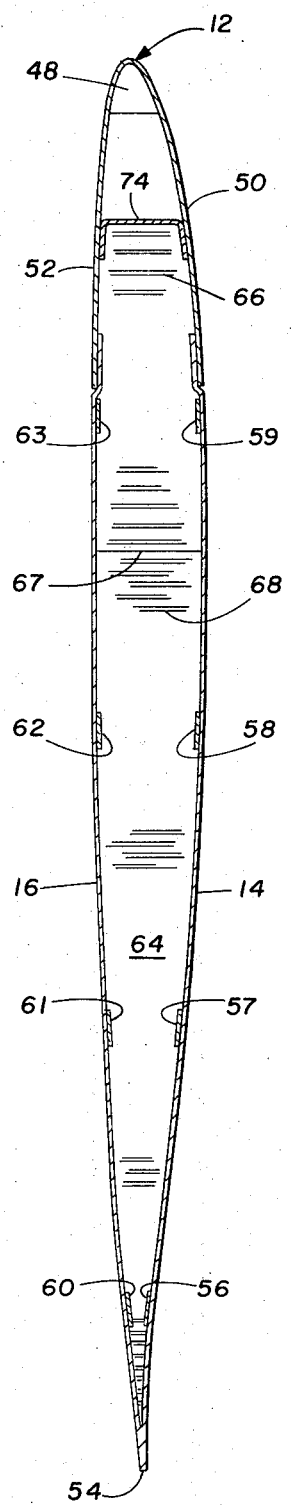
FIG. 4 is another sectional view of a rotor blade taken along the line 4—4 of FIG. 1 and showing the first and second honeycomb cellular structures and the shear boundary therebetween.

With particular reference to FIGS. 3 and 4, the leading edge spar 12 has a general U-shaped configuration and includes a nose block 48 with an upper rearward directed surface 50 and a lower rearward directed surface 52. Secured to the trailing edge of the upper surface 50 is the upper skin 14 and secured to the trailing edge of the lower surface 52 is the skin 16. The skin surfaces 14 and 16 terminate at a trailing edge seam 54 and form a tapering chamber from the connection with the U-shaped leading edge spar 12.

Mounted to the inside of the skin 14 are unidirectional fiberglass crack arrestors 56-59 that extend along a longitudinal axis of the blade. As best illustrated in FIG. 2, these crack arrestors extend substantially the length of the blade from the outboard end 18 to the inboard coupler. Similarly, attached to the skin 16 are fiberglass crack arrestors 60-63 also extending along a longitudinal axis of the blade.

To provide the required stiffness and mechanical strength to the blade 10 to withstand the shock effects of high speed flights and enable the manufacture of extended length and chord measurement blades, the internal volume of the leading edge spar 12 and the tapering chamber 64 between the skin surfaces 14 and 16 are filled with a lightweight, high impact resistance, honeycomb cellular structure. Assembled within the leading edge spar 12 and extending into the tapering chamber 64 is a first honeycomb structure 66 of a corrosion resistant aluminum alloy. Secured to the honeycomb structure 66 is a honeycomb structure 68 that fills the tapering chamber 64 from the boundary 67 between the structure 66 and the trailing edge seam 54.

As best shown by FIGS. 3 and 4, the honeycomb cellular structure 66 does not extend to completely fill the leading edge spar 12. A spar moisture seal 74 extending the full length of the blade 10 forms a forward boundary for the structure 66.

Each of the honeycomb structures 66 and 68 extends from the outboard end 18 to the inboard coupler and consists of individual hexagon shaped pillar structures (indicated in cutaway sections 70 and 72) joined in a continuous mat. In one model of a helicopter blade in accordance with the present invention, the honeycomb structure 66 was a corrosion resistant aluminum alloy having a density of 8.1 pounds per cubic foot. In this same model, the honeycomb structure 68 was also of a corrosion resistant aluminum alloy having a density of 3.1 pounds per cubic foot.

Although described with reference to a helicopter blade, it should be understood that the invention is applicable to other airfoils where shear resistance strengths are required. Thus, while only one embodiment of the invention, together with modifications thereof, has been described in detail herein and shown in the accompanying drawings, it will be evident that various further modifications are possible without departing from the scope of the invention.

What is claimed is:

1. A rotor blade for the lift rotor assembly of a helicopter, the combination which comprises:
   a U-shaped leading edge spar open at the rear and coupled along a longitudinal boundary to upper and lower skins joined together aft of said boundary at a trailing edge to form the trailing portion of said blade;
   a first honeycomb cellular structure having cells extending across the blade thickness, said structure extending aft toward the trailing edge to a line past that portion of the blade chord which includes the said longitudinal boundary; and
   a second honeycomb cellular structure having cells extending across the blade thickness and bonded to the trailing edge of said first cellular structure and characterized by a density lower than the density of said first cellular structure.

2. The rotor blade as set forth in claim 1 wherein said second cellular structure fills the trailing portion of said blade.

3. A rotor blade as set forth in claim 1 wherein said first and second structures extend substantially the chord length of said blade.

4. The rotor blade as set forth in claim 1 including a spar seal in the leading edge spar to form a forward boundary for the first honeycomb structure.

5. A rotor blade for the lift rotor assembly of a helicopter, the blade including an outboard end and an inboard coupler, comprising in combination:
   a U-shaped leading edge spar extending the length of said blade and having an upper and a lower rearwardly extending portion,
   an upper skin and lower skin joined to the trailing edge of said spar to form a longitudinal boundary and terminating at a trailing edge seam to form a tapering chamber,
   a first honeycomb cellular structure of a first density in the leading edge spar and extending into the tapering chamber between the upper and lower skins aft toward the trailing edge to a line past the said longitudinal boundary, and
   a second honeycomb cellular structure of a lower density than the first structure bonded to the trailing edge of said first structure and extending into the tapering chamber.

6. The rotor blade as set forth in claim 5 wherein said first and second honeycomb structures extend substantially the length of said spar and the tapering chamber.

7. The rotor blade as set forth in claim 5 wherein said first and second honeycomb structures have individual honeycomb cells extending across the blade thickness in the tapering chamber.

8. A rotor blade for the lift rotor assembly of a helicopter, comprising in combination:
   a U-shaped leading edge spar extending the length of said blade and having an upper and a lower rearwardly extending portion,
   an upper trailing skin and a lower trailing skin joined to the trailing edges of said spar to form a longitudinal boundary and terminating at a trailing edge seam to form a tapering chamber,
   a first honeycomb cellular structure extending from within the leading edge spar into the tapering chamber between said upper and lower skins aft toward the trailing edge to a line past the said longitudinal boundary,
   a spar seal in the leading edge spar to form a forward boundary for the extending first structure, and
   a second honeycomb cellular structure bonded to the trailing edge of the first structure and occupying the remainder of said tapering chamber and characterized by a density less than the density of said first structure.

9. A rotor blade as set forth in claim 8 wherein said first and second honeycomb structures extend substantially the length of said spar and the tapering chamber.

10. A rotor blade as set forth in claim 9 wherein said first and second honeycomb structures have individual honeycomb cells extending across the blade thickness in the tapering chamber.

* * * * *